United States Patent
Urabe et al.

(10) Patent No.: US 11,586,215 B2
(45) Date of Patent: Feb. 21, 2023

(54) CONTROL DEVICE

(71) Applicant: OMRON Corporation, Kyoto (JP)

(72) Inventors: Kentaro Urabe, Kusatsu (JP); Mamoru Egi, Otsu (JP)

(73) Assignee: OMRON Corporation, Kyoto (JP)

(*) Notice: Subject to any disclaimer, the term of this patent is extended or adjusted under 35 U.S.C. 154(b) by 174 days.

(21) Appl. No.: 17/267,034

(22) PCT Filed: Sep. 27, 2019

(86) PCT No.: PCT/JP2019/038202
§ 371 (c)(1),
(2) Date: Feb. 9, 2021

(87) PCT Pub. No.: WO2020/067445
PCT Pub. Date: Apr. 2, 2020

(65) Prior Publication Data
US 2021/0311487 A1    Oct. 7, 2021

(30) Foreign Application Priority Data
Sep. 27, 2018   (JP) .............................. JP2018-182621

(51) Int. Cl.
*G05D 1/02* (2020.01)
*G01C 21/34* (2006.01)

(52) U.S. Cl.
CPC ....... *G05D 1/0223* (2013.01); *G01C 21/3453* (2013.01); *G05D 1/0217* (2013.01); *G05D 1/0238* (2013.01)

(58) Field of Classification Search
CPC .. G05D 1/0223; G05D 1/0217; G05D 1/0238; G01C 21/3453
See application file for complete search history.

(56) References Cited

U.S. PATENT DOCUMENTS

| | | | |
|---|---|---|---|
| 2009/0043440 A1* | 2/2009 | Matsukawa | G05D 1/0238 701/25 |
| 2013/0058538 A1* | 3/2013 | Asatani | G06V 20/10 901/46 |

(Continued)

FOREIGN PATENT DOCUMENTS

| | | | |
|---|---|---|---|
| EP | 1734433 A2 * | 12/2006 | ........... G05D 1/0212 |
| JP | 2006350776 | 12/2006 | |

(Continued)

OTHER PUBLICATIONS

"International Search Report (Form PCT/ISA/210) of PCT/JP2019/038202," dated Dec. 24, 2019, with English translation thereof, pp. 1-4.

(Continued)

*Primary Examiner* — Anne Marie Antonucci
*Assistant Examiner* — Jared C Bean
(74) *Attorney, Agent, or Firm* — JCIPRNET

(57) ABSTRACT

A model prediction control part of a control device includes an obstacle avoidance control unit that operates when there are a plurality of actual obstacles to be avoided. The obstacle avoidance control unit decides the position of a virtual obstacle from the positions of the plurality of actual obstacles acquired by an acquisition part so as to be positioned between the plurality of actual obstacles, and performs model prediction control by using, as the stage cost, the addition result of a standard cost and a virtual obstacle evaluation term for which a prescribed function, which uses, as parameters, at least the position of the virtual obstacle and the position of a moving body, is multiplied by a virtual obstacle weight. Using this configuration, when the moving body is caused to follow with respect to a target trajectory by the model prediction control, a collision with an obstacle can be avoided suitably.

14 Claims, 5 Drawing Sheets

(56) References Cited

U.S. PATENT DOCUMENTS

2017/0090478 A1  3/2017  Blayvas et al.
2019/0354099 A1* 11/2019  Shomin ................. A63F 13/67

FOREIGN PATENT DOCUMENTS

JP      2011186878    9/2011
JP      2014130495    7/2014

OTHER PUBLICATIONS

"Written Opinion of the International Searching Authority (Form PCT/ISA/237) of PCT/JP2019/038202," dated Dec. 24, 2019, with English translation thereof, pp. 1-6.

Gowtham Garimella et al., "Robust obstacle avoidance for aerial platforms using adaptive model predictive control," 2017 IEEE International Conference on Robotics and Automation (ICRA), May 2017, pp. 5876-5882.

Martin Saska et al., "System for deployment of groups of unmanned micro aerial vehicles in GPS-denied environments using onboard visual relative localization," Autonomous Robots, vol. 41, Apr. 2016, pp. 919-944.

"Search Report of Europe Counterpart Application", dated Apr. 13, 2022, p. 1-p. 10.

* cited by examiner

CONTROL DEVICE

CROSS-REFERENCE TO RELATED APPLICATION

This application is a 371 application of the International PCT application serial no. PCT/JP2019/038202, filed on Sep. 27, 2019, which claims the priority benefit of Japanese Patent Application No. 2018-182621, filed on Sep. 27, 2018. The entirety of each of the above-mentioned patent applications is hereby incorporated by reference herein and made a part of this specification.

BACKGROUND

Technical Field

The present invention relates to a control device which controls a driving device that moves a moving body.

Related Art

In order to move a moving body without colliding with an obstacle, in an evaluation function for deciding a route of the moving body, an evaluation term for not allowing the moving body to approach the obstacle (a penalty term, hereinafter referred to as an obstacle evaluation term) is included for each obstacle (for example, see Patent literatures 1 and 2).

LITERATURE OF RELATED ART

Patent Literature

Patent literature 1: Japanese Patent Laid-Open No. 2011-186878
Patent literature 2: Japanese Patent Laid-Open No. 2014-130495

SUMMARY

Problems to be Solved

If the evaluation function including the obstacle evaluation term for each obstacle is used, the moving body can be moved without colliding with the obstacle. However, if the evaluation function including the obstacle evaluation term is simply used, a case in which the collision with the obstacle cannot be avoided suitably may occur, for example, a case in which the moving body comes into a stationary state, or a case in which an obstacle avoidance route of the moving body makes a large detour.

The present invention is completed in view of the above problems, and aims to provide a control device which can suitably avoid a collision with an obstacle when the moving body is caused to follow with respect to a target trajectory by model prediction control.

Means to Solve Problems

In order to achieve the above aim, a control device which controls a driving device that moves a moving body according to an aspect of the present invention includes: an acquisition part that acquires a position of each actual obstacle which may obstruct movement of the moving body along a target trajectory; and a model prediction control part that moves the moving body along the target trajectory by calculating a control input and supplying the control input to the driving device based on a prediction model, determines the presence/absence of an actual obstacle to be avoided according to information from the acquisition part, and uses a standard cost as the stage cost when there is no actual obstacle to be avoided, wherein the control input minimizes a value of an evaluation function including a sum of stage costs in a predicted section of a prescribed time width, and the prediction model is used for predicting the position of the moving body from the control input to the driving device. Besides, the model prediction control part of the control device includes an obstacle avoidance control means that operates when there are a plurality of actual obstacles to be avoided, decides the position of a virtual obstacle from the positions of the plurality of actual obstacles acquired by the acquisition part so as to be positioned between the plurality of actual obstacles, and calculates the control input that minimizes the evaluation function by using, as the stage cost, the addition result of the standard cost and a virtual obstacle evaluation term for which a prescribed function, which uses, as parameters, at least the position of the virtual obstacle and the position of the moving body, is multiplied by a virtual obstacle weight.

That is, the control device has a configuration in which a virtual obstacle is assumed to exist and the control input is calculated in a case in which the collision between the moving body and the obstacle cannot be avoided suitably if the evaluation function including the obstacle evaluation term is simply used (a case in which two obstacles exist in a way of clamping the target trajectory, or the like). Thus, according to the control device, even in the case in which the collision between the moving body and the obstacle cannot be avoided suitably if the evaluation function including the obstacle evaluation term is simply used, the collision between the moving body and the obstacle can be avoided suitably.

The obstacle avoidance control means may be a means that uses, as the stage cost, the addition result of the standard cost, the virtual obstacle evaluation term, and an actual obstacle evaluation term for which the prescribed function is multiplied by the weight for each actual obstacle to be avoided; or may be a means that uses, as the stage cost, the addition result of the standard cost and the virtual obstacle evaluation term.

When the latter means is used as the obstacle avoidance control means, a capability of (deciding the value of the virtual obstacle weight in a way that when the operation is started, a calculation result of the virtual obstacle evaluation term at that time point matches the sum of values at that time point of the actual obstacle evaluation terms for which the prescribed function is multiplied by the weight for each actual obstacle to be avoided) is preferably applied to the obstacle avoidance control means.

In addition, when there are two or three actual obstacles to be avoided, the obstacle avoidance control means may decide the position of the virtual obstacle to a position which is equidistant from the two or three actual obstacles are equal and has the distance shortest to each actual obstacle.

In addition, in the control device, a configuration in which (the model prediction control part further includes a determination means which determines whether or not the moving body comes into a speed reducing state, and the obstacle avoidance control means of the model prediction control part starts the operation when the moving body is determined to come into the speed reducing state under a situation that there are a plurality of actual obstacles to be avoided by the determination means) may be used. Moreover, as the determination means, for example, the following means can be used: a means which determines that the moving body comes into the speed reducing state when an absolute value of a difference between a current value and a previous value of the minimum value of the evaluation function, or the absolute value of the difference between a current value and a previous value of the position of the moving body is less than a prescribed threshold value; or a means which determines that the moving body comes into the speed reducing state when the absolute value of the difference between the current value and the previous value of the minimum value of the evaluation function, or the absolute value of the difference between the current value and the previous value of the position of the moving body is less than a prescribed threshold value for a prescribed number of times continuously.

In addition, as the obstacle avoidance control means, a means may be used which uses as, the prescribed function, a function in which a change rate of the virtual obstacle evaluation term in an arrangement direction of the two actual obstacles is smaller than that in another direction when there are two actual obstacles to be avoided.

The model prediction control part may take all of the actual obstacles of which the positions are acquired by the acquisition part as the obstacles to be avoided. In addition, when the positions of the plurality of actual obstacles are acquired by the acquisition part, the model prediction control part may calculate, for each of the plurality of actual obstacles, an evaluation value indicating a probability in which a collision with the moving body can occur, and may decide which of the plurality of actual obstacles is the actual obstacle to be avoided based on the evaluation value calculated for each actual obstacle.

Effect

According to the present invention, when the moving body is caused to follow with respect to the target trajectory by the model prediction control, a collision between the moving body and the obstacle can be avoided suitably.

DESCRIPTION OF THE EMBODIMENTS

Hereinafter, an embodiment of the present invention is described with reference to the drawings.

Figure 1:
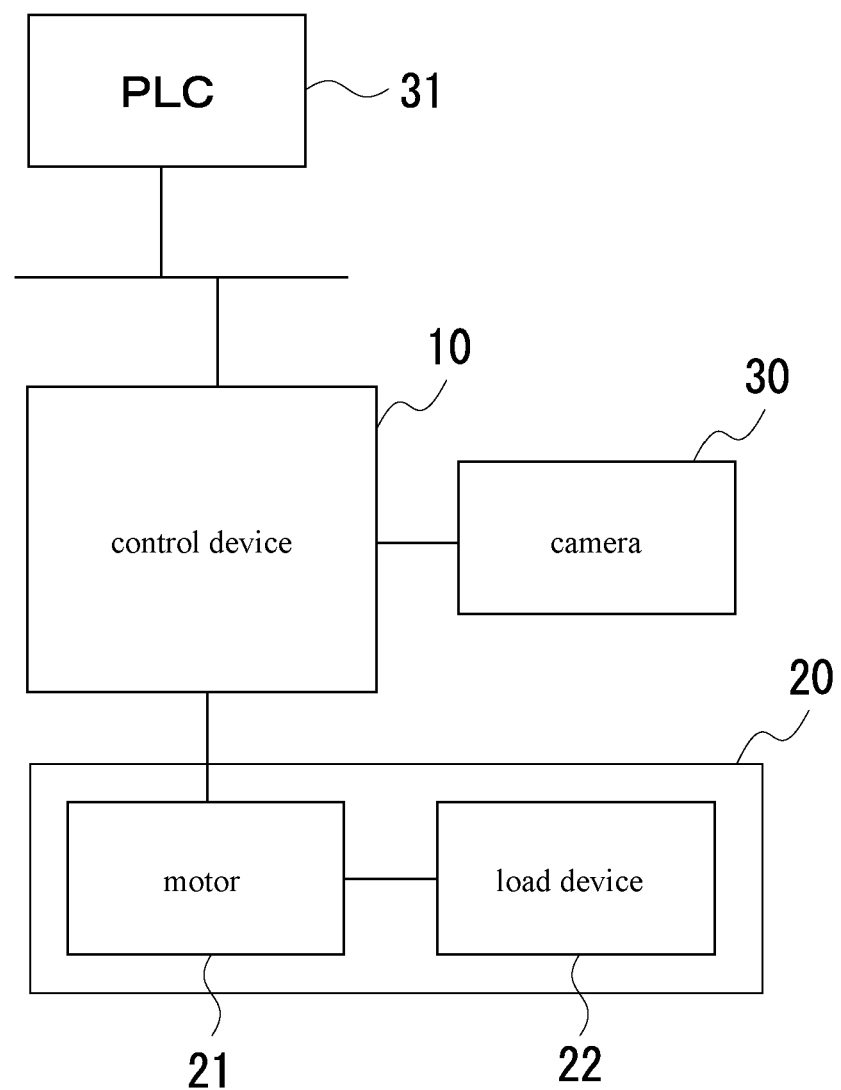
FIG. 1 is an illustration diagram of a use form of a control device according to an embodiment of the present invention.
Figure 2:
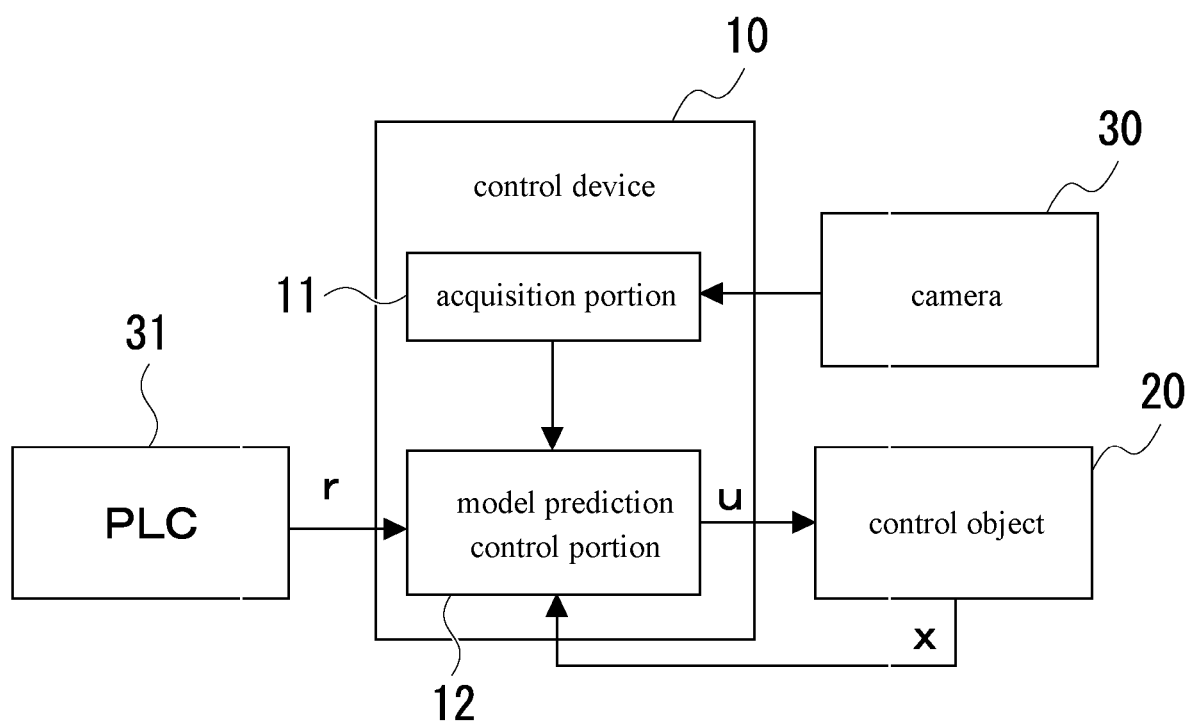
FIG. 2 is an illustration diagram of a schematic configuration of the control device according to the embodiment.

FIG. 1 shows a use form of a control device 10 according to an embodiment of the present invention, and FIG. 2 shows a schematic configuration of the control device 10 according to the embodiment.

The control device 10 (FIG. 1) according to the embodiment is a device which is used for respectively controlling, by a model prediction control, a plurality of (one in the diagram) motors 21 driving a specific load device 22 and is generally referred to as a servo amplifier, a servo driver, or the like. Moreover, the load device 22 is an arm of an industrial robot, a carrying device, or the like. Hereinafter, a part including the plurality of motors 21 controlled by the control device 10 and the load device 22 driven by each of the motors 21 is referred to as a control object 20.

As shown in FIG. 2, the control device 10 is configured to function as an acquisition part 11 and a model prediction control part 12.

The acquisition part 11 is a unit which acquires a position (center position) and a size of each actual obstacle existing in the surrounding of a moving body in the control object 20 (a hand of a robot or the like, hereinafter simply referred to as a moving body) by analyzing an imaging result obtained by a camera 30. Moreover, the camera 30 may capture images only in a prescribed range in an advancing direction of the moving body. In addition, the acquisition part 11 may acquire the position and the size only of each actual obstacle existing in the prescribed range in the advancing direction of the moving body (in other words, each actual obstacle to be avoided).

The model prediction control part 12 is a unit which controls, based on the position and the size of each obstacle acquired by the acquisition part 11 and information from the control object 20 (a position of the moving body and the like), the control object 20 by the model prediction control in order that the moving body avoids each obstacle and moves along a target trajectory instructed from a programmable logic controller (PLC) 31.

The control performed by the model prediction control part 12 is the control in which (an input u minimizing a value of an evaluation function J described below is calculated using a prediction model of the control object 20 and based on a state x of the control object to supply to the control object 20).

[Mathematical Formula 1]

$$J = \varphi(x(t+T)) + \int_0^{t+T} L(x(\tau), u(\tau))d\tau \quad \text{(Formula 1)}$$

Moreover, a first term on the right side of Formula 1 denotes a terminal cost, and L in Formula 1 denotes a stage cost. In addition, T denotes a time width which is previously set as a length of a predicted section in the model prediction control.

That is, the control performed by the model prediction control part 12 is basically the same as the model prediction control which is generally performed.

Herein, the model prediction control part 12 is configured to change the stage cost L used for the calculation of the J value depending on the situation.

Taking the above as the premise, hereinafter, a capability of the model prediction control part 12 is described specifically. Moreover, the control device 10 is a device which can also move the moving body in a three-dimensional space. However, hereinafter, the moving body is set to be moved on a plane surface for convenience of description.

The model prediction control part 12 periodically determines the presence/absence of the actual obstacle to be avoided based on the position and the size of each actual obstacle acquired by the acquisition part 11. More specifically, when no position and size of the actual obstacle is acquired by the acquisition part 11 (when there is no actual obstacle), the model prediction control part 12 determines that there is no actual obstacle to be avoided. In addition, when the positions and the sizes of one or more actual obstacles are acquired by the acquisition part 11, based on the position and the size of each actual obstacle, the model prediction control part 12 specifies actual obstacles, which satisfy a condition in which a value of an actual obstacle evaluation term $L_k$ defined by the following Formula 2 is equal to or greater than a predetermined value, from the actual obstacles of which the positions and the sizes are acquired by the acquisition part 11. Then, the model prediction control part 12 determines that each actual obstacle which has been specified is the actual obstacle to be avoided.

[Mathematical formula 2]

$$L_k = g_k \exp(-\sqrt{(x_1-x_{ok})^2+(y_1-y_{ok})^2}) \quad \text{(Formula 2)}$$

In the above Formula 2, a suffix k denotes a number which begins from 1 and is assigned for each actual obstacle that satisfies the above condition. $x_1$ and $y_1$ denote the position of the moving body (x and y coordinates), and $x_{ok}$ and $y_{ok}$ denote the position of an actual obstacle k (x and y coordinates). In addition, $g_k$ denotes a value which is decided according to the size of the actual obstacle k.

Moreover, the model prediction control part 12 is configured to select three actual obstacles in descending order of values of the actual obstacle evaluation terms and determines that each of the selected actual obstacles is the actual obstacle to be avoided when there are four or more actual obstacles which satisfy the above condition. Thus, the maximum value of the reference character k is 3.

In addition, the model prediction control part 12 is configured to periodically determine whether or not the moving body comes into a speed reducing state. The determination processing may determine that the moving body comes into the speed reducing state when an absolute value of a difference between a current value and a previous value of the position of the moving body is less than a prescribed position threshold value; or may determine that the moving body comes into the speed reducing state when the absolute value of the difference between a current value and a previous value of the minimum value of the calculated J value is less than a prescribed threshold value of the J value. In addition, in order to prevent erroneous detection, the above determination processing may be set to be a processing which determines that the moving body comes into the speed reducing state when the absolute value of the difference between the current value and the previous value of the position of the moving body, or the absolute value of the difference between the current value and the previous value of the minimum value of the J value, is less than a threshold value for a prescribed number of times continuously.

As described above, the model prediction control part 12 periodically determines whether or not the moving body comes into the speed reducing state and periodically determines the presence/absence of the actual obstacle to be avoided, and the model prediction control part 12 also performs a processing of determining which of the first to the third conditions described below is satisfied based on both of the determination results.

First condition: there is no actual obstacle to be avoided.
Second condition: there are one or more actual obstacles to be avoided, and the third condition is not satisfied.
Third condition: under a situation that there are a plurality of actual obstacles to be avoided, the moving body comes into a speed reducing state.

Besides, when the first condition is satisfied (when there is no actual obstacle to be avoided), the model prediction control part 12 performs a first model prediction control that is a model prediction control using a standard cost $L_0$ described below as a stage cost L.

[Mathematical formula 3]

$$L_0 = \frac{1}{2}\left((xref - x)^T Q(xref - x) + u^T Qu\right)$$

Moreover, xref denotes a target state amount at a certain time in a predicted section, x denotes a state amount at the same time, and u denotes a control input at the same time. In addition, Q denotes a coefficient (weight coefficient) indicating a weight of the state amount in the stage cost, and R denotes a coefficient (weight coefficient) indicating a weight of the control input.

In addition, when the second condition is satisfied, the model prediction control part 12 performs a second model prediction control which is model prediction control using, as the stage cost L, the following value, that is, a sum of the standard cost $L_0$ and the actual obstacle evaluation term $L_k$ of each actual obstacle.

[Mathematical formula 4]

$$L = L_0 + \sum_{k=1}^{kmax} L_k$$

Moreover, kmax in the above formula denotes the total number of the actual obstacles to be avoided ($\leq 3$ in the embodiment).

In addition, when the third condition is satisfied, firstly, the model prediction control part 12 decides a position which is equidistant from the two or three actual obstacles to be avoided and has the shortest distance to each actual obstacle. Next, the model prediction control part 12 calculates a weight $g_p$ in which a value of the virtual obstacle evaluation term described below is the sum of the value of the actual obstacle evaluation term of each actual obstacle.

$$L_p = g_p \exp(-\sqrt{(x_1-x_{pk})^2+(y_1-y_{pk})^2}) \quad \text{[Mathematical formula 5]}$$

Moreover, $x_{pk}$ and $y_{pk}$ denote the position of the virtual obstacle which is decided (x and y coordinates).

Specifically, for example, when there are two actual obstacles to be avoided, the model prediction control part 12 calculates the $g_p$ according to the following formula by using values $V_1$ and $V_2$ of actual obstacle evaluation terms $L_1$ and $L_2$ at that time point (in a case in which the moving body is in the current position).

$$g_p = (V_1+V_2)\exp(\sqrt{(x_1-x_{pk})^2+(y_1-y_{pk})^2}) \quad \text{[Mathematical Formula 6]}$$

Besides, the model prediction control part 12 starts a third model prediction control which is a model prediction control using a sum of the baseline cost $L_0$ and a virtual obstacle evaluation term $L_p$ as the stage cost L.

Figure 3:
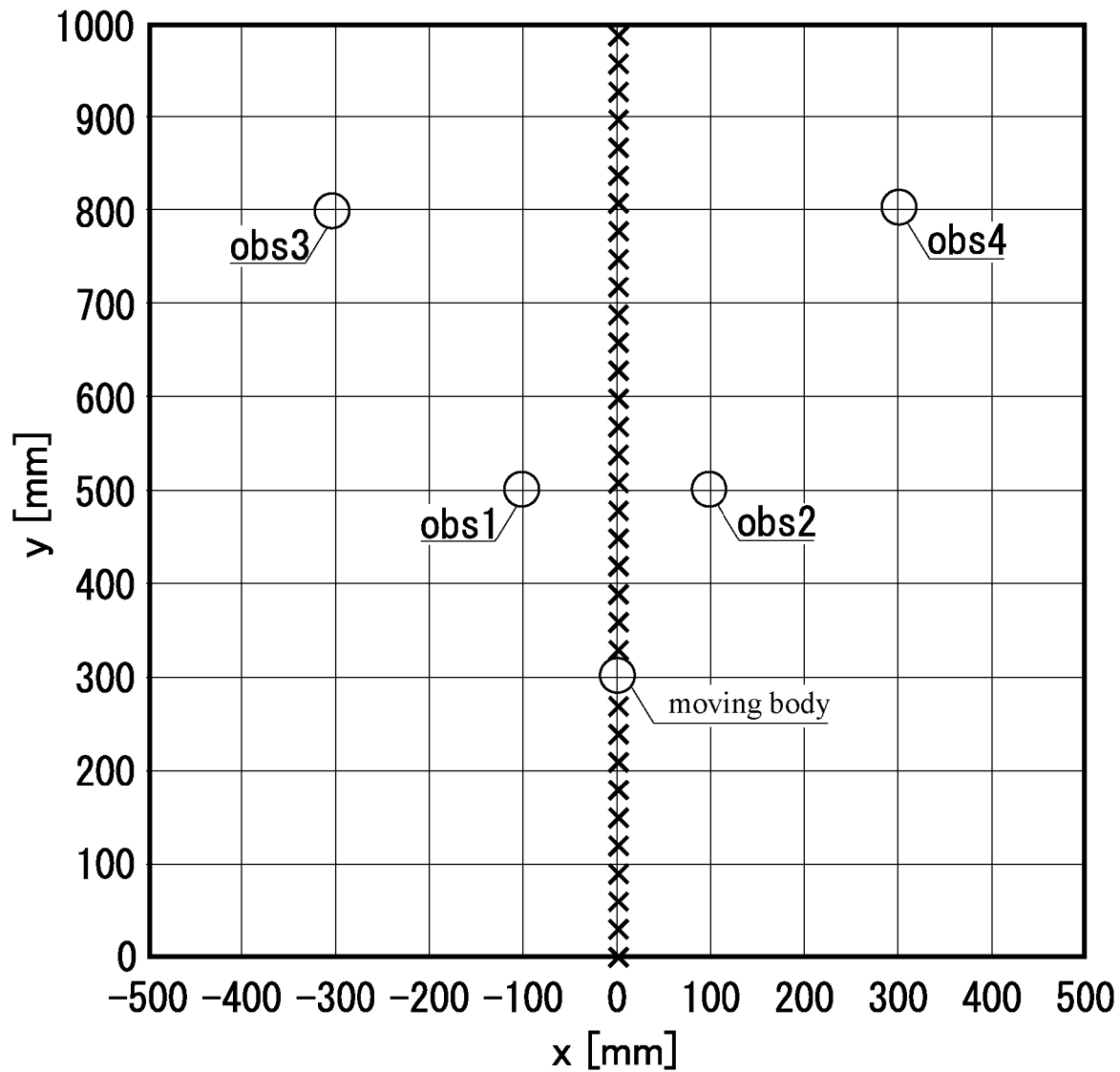
FIG. 3 is an illustration diagram of a control result example of the control device according to the embodiment.

As described above, with respect to the control device 10, a capability is applied of performing the model prediction control using an evaluation function in which the obstacle evaluation term of each actual obstacle is replaced by the virtual obstacle evaluation term (the third model prediction control) when the moving body comes into the speed reducing state under the situation that there are the plurality of actual obstacles to be avoided. In this case, if the evaluation function including the obstacle evaluation term is simply used, a problem may be generated easily, for example, a problem that the moving body comes into a stationary state, or a problem that an obstacle avoidance route of the moving body makes a large detour. Besides, according to the third model prediction control, as shown by a solid line in FIG. 3, the moving body can be moved in a form that the above troubles do not occur. Moreover, in FIG. 3, obs 1 and obs 2 represent actual obstacles to be avoided, and pobs represents a virtual obstacle. In addition, x denotes a target position group which predetermines the target trajectory (a command from a PCS 32).

Figure 4:
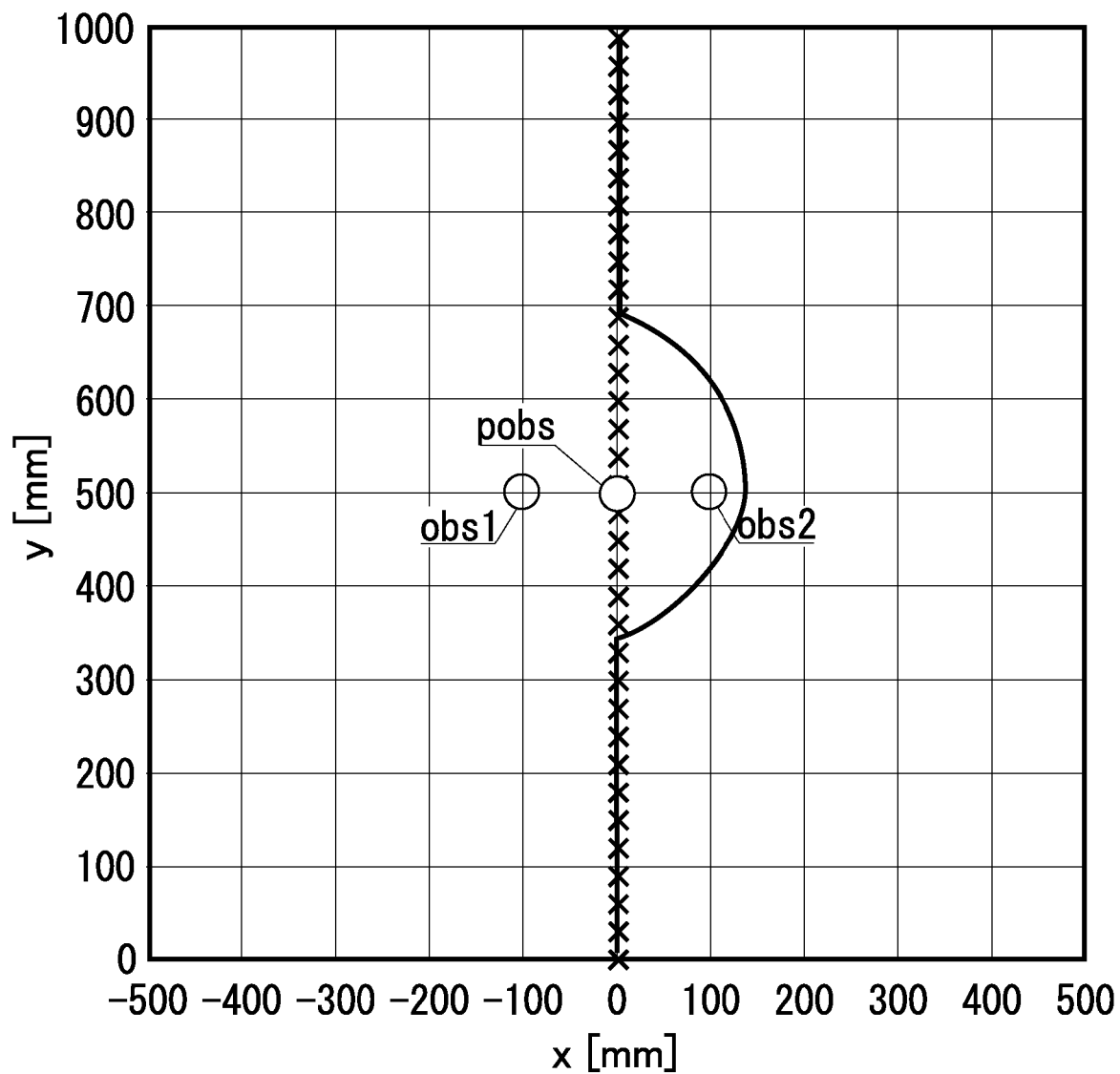
FIG. 4 is an illustration diagram of a capability of the control device according to the embodiment.
Figure 5:
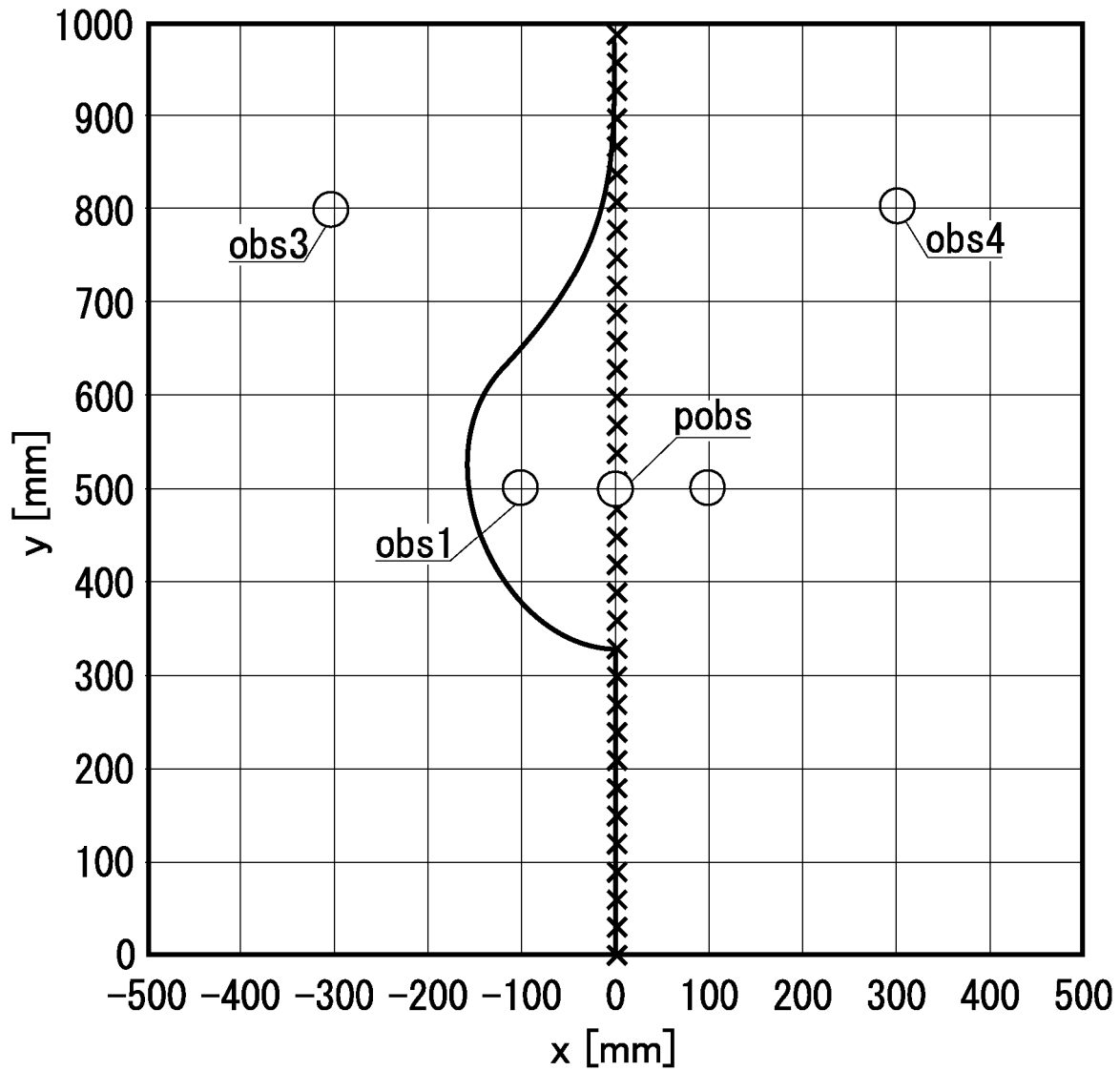
FIG. 5 is an illustration diagram of a control result example of the control device according to the embodiment.

In addition, the control device 10 is configured to treat only an actual obstacle having a large value of the obstacle evaluation term as the actual obstacle to be avoided. Thus, for example, as shown in FIG. 4, even when there are four actual obstacles obs 1 to obs 4, the actual obstacles obs 3 and obs 4 having small values of the obstacle evaluation terms are not treated as the actual obstacles to be avoided. Therefore, as shown in FIG. 5, even when there are a great number of actual obstacles (obs 1 to obs 4 in the diagram), the avoidance route of the actual obstacle can also be prevented from excessively making a large detour.

<Deformation Form>

With regard to the control device 10 according to the embodiment described above, various deformations can be made. For example, during the third model prediction control, the following stage cost L may be used.

[Mathematical formula 7]

$$L = L_0 + \sum_{k=1}^{kmax} L_k + L_p \quad \text{(Formula 3)}$$

Moreover, when the above stage cost L is used, the $g_p$ value can be a value (for example, a value which is previously set) smaller than the above value.

In addition, during the third model prediction control, a calculation may be performed in which each $L_k$ value in the above Formula 3 is set to "0".

In addition, the actual obstacle evaluation term and the virtual obstacle evaluation term may be functions in which the values become greater as the distances to the moving body become shorter (in other words, a probability of the collision with the moving body becomes higher). Thus, a function different from the above may be used as each evaluation term. In addition, in order to prevent the avoidance trajectory from excessively making a large detour (in order to shorten a period in which the moving body is away from the target trajectory), when there are two actual obstacles to be avoided, as the virtual obstacle evaluation term, a function may be used in which a change rate in an arrangement direction of the two actual obstacles is smaller than that in another direction.

The control device 10 can also be deformed to a device which uses different actual obstacle evaluation terms when selecting an actual obstacle to be an avoided object and when performing actual model prediction control. In addition, it is natural that, for example, the camera 30 may be a light detection and ranging (LIDAR) or the like, and the control device 10 may be deformed to a device which controls a movement direction of a vehicle.

<Additions>

A control device (10), which controls a driving device (21) that moves a moving body, including:

an acquisition part (11) that acquires a position of each actual obstacle which may obstruct movement of the moving body along a target trajectory; and a model prediction control part (12) that moves the moving body along the target trajectory by calculating a control input and supplying the control input to the driving device based on a prediction model, determines the presence/absence of an actual obstacle to be avoided according to information from the acquisition part, and uses a standard cost as the stage cost when there is no actual obstacle to be avoided, wherein the control input minimizes a value of an evaluation function including a sum of stage costs in a predicted section of a prescribed time width, and the prediction model is used for predicting the position of the moving body from the control input to the driving device, and wherein the model prediction control part (12) includes an obstacle avoidance control means that operates when there are a plurality of the actual obstacles to be avoided, decides the position of a virtual obstacle from the positions of the plurality of actual obstacles acquired by the acquisition part so as to be positioned between the plurality of actual obstacles, and calculates the control input that minimizes the evaluation function by using, as the stage cost, an addition result of the standard cost and a virtual obstacle evaluation term for which a prescribed function, which uses, as parameters, at least the position of the virtual obstacle and the position of the moving body, is multiplied by a virtual obstacle weight.

What is claimed is:

1. A control device which controls a driving device that moves a moving body, comprising:

a processor, configured to acquire a position of each of actual obstacles which may obstruct movement of the moving body along a target trajectory; and perform a model prediction control to move the moving body along the target trajectory by calculating a control input and supplying the control input to the driving device based on a prediction model, determine presence/absence of the actual obstacle to be avoided according to information acquired from the processor, and use a standard cost as a stage cost when there is no actual obstacle to be avoided, wherein the control input is configured to minimize a value of an evaluation function comprising a sum of stage costs in a predicted section of a prescribed time width, and the prediction model is configured to be used for predicting a position of the moving body from the control input to the driving device, and wherein the model prediction control is further configured to perform an obstacle avoidance control that is configured to operate when there are a plurality of the actual obstacles to be avoided, decide a position of a virtual obstacle from the positions of the plurality of actual obstacles acquired by processor so as to be positioned between the plurality of actual obstacles, and calculate the control input that is configured to minimize the evaluation function by using, as the stage cost, an addition result of the standard cost and a virtual obstacle evaluation term for which a prescribed function, which uses, as parameters, at least the position of the virtual obstacle and the position of the moving body, is multiplied by a virtual obstacle weight.

2. The control device according to claim 1, wherein the obstacle avoidance control is configured to use, as the stage cost, an addition result of the standard cost, the virtual obstacle evaluation term, and an actual obstacle evaluation term for which the prescribed function is multiplied by the weight for each of the actual obstacles to be avoided.

3. The control device according to claim 2, wherein when there are two or three actual obstacles to be avoided, the obstacle avoidance control is configured to decide the position of the virtual obstacle to a position which is equidistant from the two or three actual obstacles and has the shortest distance to each of the actual obstacles.

4. The control device according to claim 2, wherein the model prediction control is further configured to determine whether or not the moving body comes into a speed reducing state, and
the obstacle avoidance control is configured to start operations when the moving body is determined to come into the speed reducing state under a situation that there are the plurality of actual obstacles to be avoided by the model prediction control.

5. The control device according to claim 1, wherein the obstacle avoidance control is configured to use, as the stage cost, an addition result of the standard cost and the virtual obstacle evaluation term.

6. The control device according to claim 5, wherein the obstacle avoidance control is configured to decide a value of the virtual obstacle weight in a way that when starting operations, a calculation result of the virtual obstacle evaluation term at that time point matches the sum of values at that time point of the actual obstacle evaluation terms for which the prescribed function is multiplied by the weight for each of the actual obstacles to be avoided.

7. The control device according to claim 6, wherein When there are two actual obstacles to be avoided, the obstacle avoidance control is configured to use, as the prescribed function, a function in which a change rate of the virtual obstacle evaluation term in an arrangement direction of the two actual obstacles is smaller than that in another direction.

8. The control device according to claim 5, wherein when there are two or three actual obstacles to be avoided, the obstacle avoidance control is configured to decide the position of the virtual obstacle to a position which is equidistant from the two or three actual obstacles and has the shortest distance to each of the actual obstacles.

9. The control device according to claim 5, wherein the model prediction control is further configured to determine whether or not the moving body comes into a speed reducing state, and
the obstacle avoidance control is configured to start operations when the moving body is determined to come into the speed reducing state under a situation that there are the plurality of actual obstacles to be avoided by the model prediction control.

10. The control device according to claim 1, wherein when the positions of the plurality of actual obstacles are acquired by the processor, the model prediction control is configured to calculate, for each of the plurality of actual obstacles, an evaluation value indicating a probability in which a collision with the moving body may occur, and decides which of the plurality of actual obstacles is the actual obstacle to be avoided based on the evaluation value calculated for each of the actual obstacles.

11. The control device according to claim 1, wherein when there are two or three actual obstacles to be avoided, the obstacle avoidance control is configured to decide the position of the virtual obstacle to a position which is equidistant from the two or three actual obstacles and has the shortest distance to each of the actual obstacles.

12. The control device according to claim 1, wherein the model prediction control is further is configured to determine whether or not the moving body comes into a speed reducing state, and
the obstacle avoidance control is configured to start operations when the moving body is determined to come into the speed reducing state under a situation that there are the plurality of actual obstacles to be avoided by the model prediction control.

13. The control device according to claim 12, wherein when an absolute value of a difference between a current value and a previous value of a minimum value of the evaluation function, or an absolute value of a difference between a current value and a previous value of the position of the moving body is less than a prescribed threshold value, the model prediction control is further configured to determine that the moving body comes into the speed reducing state.

14. The control device according to claim 13, wherein when the absolute value of the difference between the current value and the previous value of the minimum value of the evaluation function, or the absolute value of the difference between the current value and the previous value of the position of the moving body is less than the prescribed threshold value for a prescribed number of times continuously, the model prediction control is further configured to determine that the moving body comes into the speed reducing state.

* * * * *